Nov. 17, 1970   W. H. BENDALL   3,540,302
SEGMENTAL ROLLER CHAIN
Filed Oct. 23, 1969
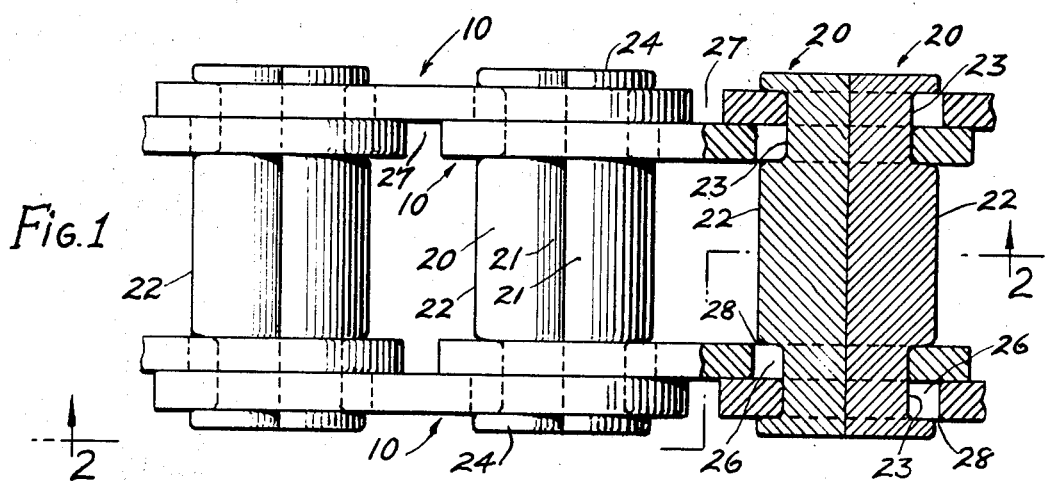
Fig.1
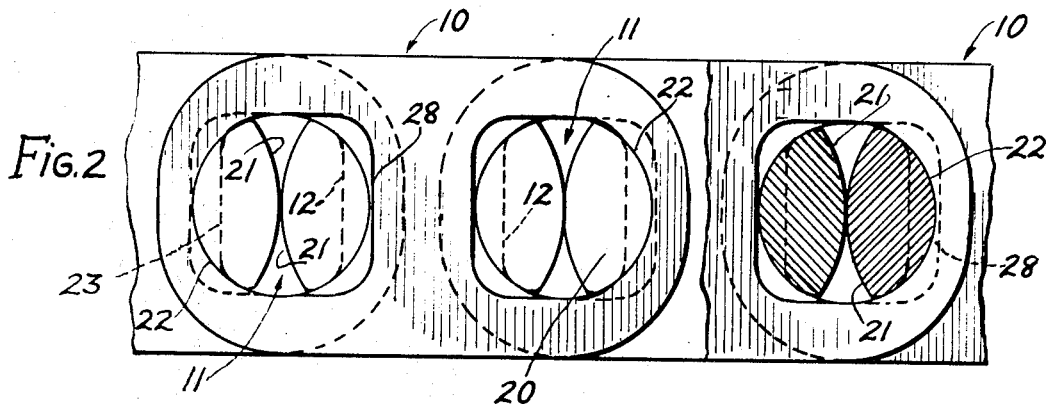
Fig.2
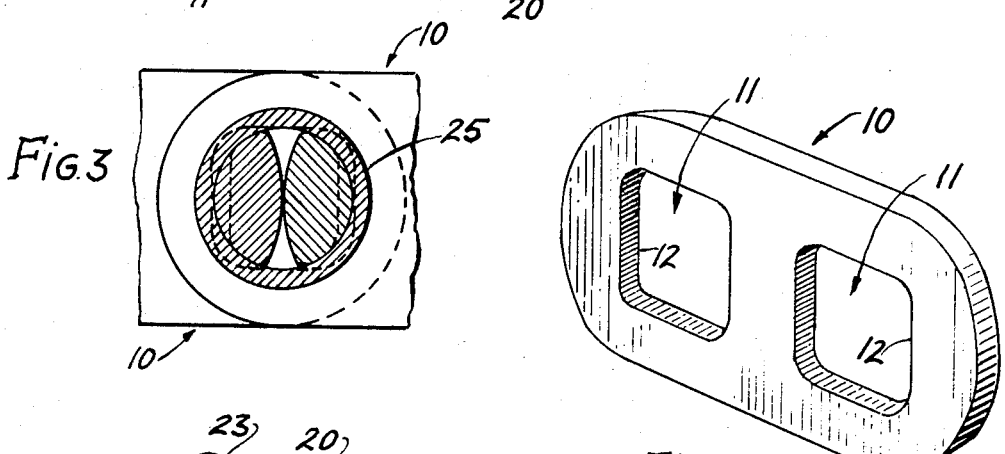
Fig.3
Fig.5
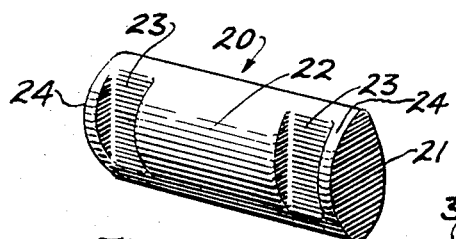
Fig.4
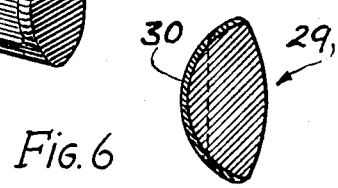
Fig.6
INVENTOR.
Wilfrid H Bendall

United States Patent Office 3,540,302
Patented Nov. 17, 1970

3,540,302
SEGMENTAL ROLLER CHAIN
Wilfrid H. Bendall, 19 N. Broad St.,
Pawcatuck, Conn. 02891
Filed Oct. 23, 1969, Ser. No. 868,828
Int. Cl. F16g *13/07*
U.S. Cl. 74—253
10 Claims

ABSTRACT OF THE DISCLOSURE

A power transmission link chain utilizing segmental roller members having integral roller bearing, sprocket teeth engagement and assembly retention portions, interconnecting the link members and reducing the required number of interchangeable parts to two per pitch length of the chain. The segmental roller members further retain the assembled chain in a manually separable form.

BACKGROUND OF THE INVENTION

Field of the invention

This invention relates generally to pivoted link drive chains and particularly to new and useful improvements in roller type chains leading to a simpler and more economical construction with substantially higher speed and power transmission capability.

Description of the prior art

Of the two types of power transmission chain in widest use, namely, the roller chain and the inverted tooth (silent) chain, the roller chain and its drive sprockets have the greatest industrial importance and the largest manufacture. While long established as an indispensable machine component and rigidly standardized in production, it is well known in the art that the roller chain's highest potential power transmitting capability is restricted by adverse performance characteristics inherent in its operation. At and above certain operating speeds and loads for each pitch size of chain, impact against the drive sprocket teeth results in roller breakage and failure of the drive. A concomitant difficulty is the internal friction and consequent destructive galling of the bearing surfaces in the round pin joint and bushing. A further adverse characteristic is the angular speed variation, a vibratory motion of the drive strand caused by its successive rise and fall as the concentrically pivoted links conform to an essentially polygonal pitch line on the drive sprockets, increasing impact and fatigue stresses in the chain parts.

Aside from these performances disadvantages and the desirability of eliminating them, the industrially standardized roller chain may be considered needlessly complex in design and manufacture. It requires five individually shaped and dimensioned parts for each pitch length of the chain, namely, a roller link plate, a bushing link plate, a bushing, a pin, and a roller, all requiring specialized metallurgical treatment and manufacture to extremely close dimensional tolerances. The method of assembly further involves critical press fitting of the parts, imposing high residual stresses and additional complex assembly and retention means.

SUMMARY OF THE INVENTION

The chain of the present invention utilizes interchangeable inside and outside link plates, each having a pair of substantially rectangular apertures constituting pitch holes whose linear spacing defines the pitch length of the links. For each single and multiple width of an assembled chain the link plates are arranged end to end in laterally spaced alternating inside and outside pairs, with overlapping end portions and registering end apertures. Thus arranged the link plates facilitate interconnection by parallel segmental roller members which extend transversely through the registering apertures. The segmental roller members are provided with laterally spaced notches in which bearing edges of the link apertures seat and are secured apart at a dimension corresponding to the sprocket tooth clearance space of an equivalent pitch standard roller chain. The segmental roller members have coacting surface portions for relatively frictionless rolling bearing contact with each other when the chain is engaging a drive sprocket and have surface portions external thereto for relatively stationary bearing contact with drive sprocket teeth. As assembled, in pairs, these external portions have an effective dimension corresponding to the roller dimension (diameter) of a standard roller chain of equivalent link pitch size.

The rolling contact of the segmental members during link articulation on a drive sprocket imparts a degree of correction of the objectionable angular speed variation described above. As each pitch length of the chain engages a drive sprocket the rolling motion of its leading segmental member results in a slight radial outward shift of the line of the drive strand, holding it closer to a true sprocket pitch circle and thus offsetting the radially inward motion of the pin-jointed standard chain linkage, which is the primary cause of the angular speed variation.

To facilitate assembly or disassembly of the chain at any pitch center each aperture of the link plates is dimensioned linearly with respect to the assembled chain length to provide minimal clearance for free insertion or removal of first one member of a given pair of segmental roller members and then the other. Removal of the first one is effected when the end apertures of a coincident pair of link plates are contracted linearly out of their notched seating and into close registration with the apertures of an overlapped link pair. The other segmental roller member is then freely removable in the additional space vacated by the first member and the chain length is open at that point permitting its removal or installation on drive sprockets, as required. The normal amount of slack in a properly installed chain is sufficient to permit doing this without disturbing the sprocket centers of an installed drive.

A modification of the preferred two-part embodiment of this invention includes use of a cylindrical bushing in free running assembly on segmental roller pairs of proportionately smaller diameter. The bushing is given the same external diameter as that of a roller of equivalent standard chain pitch size, and fabricated of nonmetallic material, can be utilized to cushion engagement contact with the teeth of drive sprockets. Alternatively, the sprocket engagement portions of the segmental roller members can have such material bonded thereto for the same purpose.

From the foregoing description it can be inferred that the primary object of this invention is to provide an improved drive chain comprised essentially of two interchangeable parts (a link plate and a segmental roller) economical to manufacture, efficient in operation on industrially standardized roller chain sprockets, and providing a substantially higher speed and power capability than attainable with the present standard roller chain construction.

A further important object is to provide a drive chain with link interconnecting members relatively frictionless in operation and having integral sprocket tooth engagement portions and link spacing and retention means within industrially standardized chain and drive sprocket operating dimensions.

A further object of this invention is to provide a drive chain with link interconnecting members having a maximum effective bearing diameter, transverse bearing width and bearing contact radii within the controlling dimensions required for operation on industrially standardized drive sprockets.

Another important object of this invention is to provide a drive chain having integral means for spacing and retaining the assembled link members with said spacing and retaining means dimensioned to enable chain disassembly at any link pivotal position without special tools.

Still an other important object of this invention is to provide a roller type chain with link interconnecting means inherently adapted to reduce the objectionable angular speed variation of such chains.

These objects are further disclosed in the following description and accompanying drawing in which like reference characters designate like parts throughout and in which:

FIG. 1 is a partly sectioned plan view of a length of the segmental roller chain of this invention, FIG. 2 is a partly sectioned side elevational view taken on the line 2—2 of FIG. 1, FIG. 3 is a sectioned side view of a modification substantially as it would appear if substituted for the sectioned portion of FIG. 2, FIG. 4 is a perspective view of a segmental roller member of the chain of this invention, FIG. 5 is a perspective view of a link plate member of the chain, and FIG. 6 is a sectional view of a modified segmental roller member.

Referring to the drawings, FIGS. 1 and 2 show a length of the chain provided with laterally and linearly spaced alternating inside and outside pairs of apertured link plate members 10 assembled with overlapping end portions and registering end apertures 11, interconnected by parallel pairs of segmental roller members 20 which extend transversely through the apertures. As shown in FIGS. 2 and 5 the link members have substantially rectangular apertures at each end providing inner and outer planar edge portions 12 extending normal to a line through the interconnected link members for seating against the roller members. The roller members have coacting portions 21 adapted for opposed rolling bearing contact with each other and portions 22 shaped for bearing contact with drive sprocket teeth. The portions 22 of the paired roller members may have an effective conjoined external diameter equivalent to that of the roller diameter of a standard roller chain of equivalent pitch.

As shown in FIG. 4 the segmental roller members are further provided with laterally spaced notches 23 in which the planar edge portions 12 of the link members seat to transmit a working load. It will be noted that these notches also serve to space the links laterally apart and, by means of the short end walls 24 of the notches, secure the members against lateral separation.

From further reference to FIGS. 1 and 2, with particular reference to the arrangement permitting convenient insertion or removal of any part of the chain, it will be observed that the end to end spacing of the link members and the linear spacing of the inner and outer edge portions 12 of each link aperture provide clearance spaces 26 and 27 for this purpose. These clearances enable endwise contraction of a given portion of the chain to move the links out of their notched seating, bringing the link apertures into close registration and thus facilitating removal or insertion of the segmental roller members. As described above, removal of one segmental roller in this manner permits ready removal of the other member of the pair, the clearances 28 between the edges of the link apertures and the maximum diametrical dimension of the paired segmental members being made nominally sufficient to accomplish this with manual ease.

While the foregoing description exemplifies the preferred two-part construction of the chain of this invention, the modification in FIG. 3 shows its adaptability to use of a supplementary member comprising a tubular bushing 25 in free running assembly on the segmental roller members. The bushing may be constructed of suitable nonmetallic material to cushion engagement impact with the sprocket teeth. Its assembly is accomplished by locating it between the link plates while inserting the segmental members. Alternatively, since the segmental roller members are not required to roll in contact with drive sprocket teeth, their sprocket engagement portions may have a shock absorbent material bonded thereto. FIG. 6 is a cross sectional view of a roller member 29 as modified for this purpose by the addition of a resilient coating 30 on its sprocket engagement portion.

Desirable materials of construction for this chain are, in general, those currently specified for present types of drive chain and are too well known in the art to require particularization here. Likewise the practical manufacturing tolerances, relative hardness of the parts and the quality of finish are equally well known, the advantage of the present invention in this connection being that its design enables these requirements to be more easily and more economically realized.

While the present description of the chain of this invention exemplifies its adaptability to operation on existing drive sprockets of wide use and availability, it should be observed that the portions 22 of the roller members which engage drive sprocket teeth may readily be modified to adapt them to engage other sprocket tooth forms or any future modifications of the industrially standardized sprocket tooth forms.

Accordingly it will be understood that the forms of this invention herewith disclosed and described are to be taken as preferred examples thereof, and that various changes may be made in the shape, size and arrangement of the parts within the scope of the invention as defined by the appended claims.

Having thus described the invention, I claim:

1. A segmental roller chain comprising interconnected links of flat sheet material each having a substantially rectangular aperture at each end thereof, arranged end to end in lateraly spaced alternating inside and outside pairs with overlapping end portions and registering end apertures, and link interconnecting means comprising parallel pairs of segmental roller members extending transversely through the apertures, said roller members having coacting portions shaped for bearing contact with each other and portions external thereto shaped for bearing contact with the teeth of drive sprockets, said external portions being further provided with laterally spaced notches adapted to receive edge portions of the link apertures and retain the link members in said laterally spaced arrangement.

2. The segmental roller chain of claim 1 in which one of each pair of said roller members is adapted for stationary bearing contact with the teeth of a drive sprocket and further constitutes a stationary bearing for rotation of a coacting roller member and coacting pairs of link members in notched seating thereon when the chain is engaging a drive sprocket and transmitting power.

3. The segmental roller chain of claim 1 in which each of said link pairs is in notched seating on a roller member and is adapted to control rotation of said roller member when said link pairs rotate out of a colinear position.

4. The segmental roller chain of claim 1 in which each segmental roller member is provided with two working surfaces, one of said surfaces being shaped and arranged for rolling bearing contact with a like surface of a cooperating roller member and the other of said surfaces being shaped and arranged to engage a drive sprocket tooth when the chain is transmitting power.

5. The segmental roller chin of claim 1 in which each of said link apertures is further characterized by inner and outer edge portions extending normal to a line through the interconnected link members, said edge portions being spaced linearly apart to provide assembly and removal clearance for the segmental roller pairs.

6. The segmental roller chain of claim 5 in which said edge portions of a link aperture are in notched seating and laterally spaced retention on a roller member and in clearance therewith at other edge portions of said aperture.

7. The segmental roller chain of claim 6 in which said clearance is arranged to enable endwise contraction of the link end to end spacing for removal or insertion of said roller members.

8. The segmental roller chain of claim 1 in which each of said link members is shaped and arranged to provide endwise clearance between adjacent outer ends of the link members and equal endwise clearance in each aperture.

9. The segmental roller chain of claim 1 further comprising cylindrical bushing means positioned between laterally spaced pairs of link members and enclosing portions of roller pairs extending therebetween.

10. The segmental roller chain of claim 1 in which said external portions of the roller pairs have shock absorbent material bonded thereto.

References Cited

UNITED STATES PATENTS

| | | | |
|---|---|---|---|
| 1,201,736 | 10/1916 | Howe | 74—253 |
| 1,273,001 | 7/1918 | Rockenfield | 74—251 |

FOREIGN PATENTS

| | | |
|---|---|---|
| 723,508 | 1/1932 | France. |

JAMES A. WONG, Primary Examiner

U.S. Cl. X.R.

74—250, 254